US012497269B2

(12) United States Patent
Sundine et al.

(10) Patent No.: US 12,497,269 B2
(45) Date of Patent: Dec. 16, 2025

(54) CONTAINER LIFTING SYSTEM

(71) Applicant: RADIA, Plymouth, MN (US)

(72) Inventors: Erik John Sundine, Monticello, MN (US); Josh Robert Erdman, Delano, MN (US)

(73) Assignee: Radia, Plymouth, MN (US)

( * ) Notice: Subject to any disclaimer, the term of this patent is extended or adjusted under 35 U.S.C. 154(b) by 945 days.

(21) Appl. No.: 17/697,293

(22) Filed: Mar. 17, 2022

(65) Prior Publication Data

US 2022/0297979 A1 Sep. 22, 2022

Related U.S. Application Data

(60) Provisional application No. 63/163,312, filed on Mar. 19, 2021.

(51) Int. Cl.
*B66C 1/62* (2006.01)
*B66C 1/66* (2006.01)

(52) U.S. Cl.
CPC ................ *B66C 1/625* (2013.01); *B66C 1/62* (2013.01); *B66C 1/663* (2013.01)

(58) Field of Classification Search
CPC .. B66C 1/24; B66C 1/62; B66C 1/625; B65G 7/12; B65G 65/24
See application file for complete search history.

(56) References Cited

U.S. PATENT DOCUMENTS 201,648 A * 3/1878 Bulkeley ................. B66C 1/422 294/113
594,644 A * 11/1897 McCorkile ................ B66C 1/24 294/120
(Continued)

FOREIGN PATENT DOCUMENTS

DE 202017103323 U1 * 7/2017
KR 20100001227 U * 2/2010
(Continued)

OTHER PUBLICATIONS

"5 gal pail lift", downloaded from https://www.youtube.com/watch?v=XqiL3KxnJKs&feature=youtu.be on Mar. 17, 2022, 1 page.
(Continued)

*Primary Examiner* — Thomas E Lazo

(57) ABSTRACT

A lifting assistance apparatus includes a vertically-suspended lift control device configured to selectively linearly retract, linearly extend, or hold a retractable load-bearing feature, a lifting attachment attached to the retractable load-bearing feature, where the lifting attachment includes an angled portion having two horizontally opposed lifting arms connected via a member and configured to fit to a container with a protrusion, such that the two lifting arms when positioned directly below the protrusion are configured to selectively contact and lift the container as the lifting attachment is at least partially lifted by a retraction of the load-bearing feature, and a graspable portion configured to permit a user to select a horizontal position and height of the container using the control device by moving the container vertically and/or horizontally, where the control device operates to provide assistance to the user when moving the container in the vertical direction.

19 Claims, 13 Drawing Sheets

(56) References Cited

U.S. PATENT DOCUMENTS

| | | | | | |
|---|---|---|---|---|---|
| 642,796 | A * | 2/1900 | Jones | B66C 1/24 | 294/67.2 |
| 732,884 | A * | 7/1903 | Normandin | B66C 1/24 | 294/67.2 |
| 969,154 | A * | 9/1910 | Buckwalter | B66C 1/24 | 294/67.2 |
| 2,239,135 | A * | 4/1941 | Wehr | B66C 1/24 | 294/67.2 |
| 2,519,067 | A * | 8/1950 | Rich | B66C 1/625 | 294/112 |
| 2,690,926 | A * | 10/1954 | Betz | B66C 1/24 | 294/67.21 |
| 3,760,742 | A * | 9/1973 | Roloff | D06F 53/005 | 105/151 |
| 4,256,337 | A * | 3/1981 | Wappler | B66C 1/24 | 414/722 |
| 4,902,191 | A | 2/1990 | Cumbest et al. | | |
| 6,036,247 | A * | 3/2000 | Gertz | B66C 1/625 | 294/90 |
| 7,043,337 | B2 * | 5/2006 | Colgate | B66C 13/063 | 212/270 |
| 8,550,517 | B1 * | 10/2013 | Bates | B66C 1/625 | 294/90 |
| 9,546,079 | B1 * | 1/2017 | Mercier | B66C 1/16 | |
| 10,457,527 | B2 | 10/2019 | Johansson | | |
| 2010/0140968 | A1 * | 6/2010 | McClenaghan | B66C 1/625 | 294/81.61 |

FOREIGN PATENT DOCUMENTS

| | | | | |
|---|---|---|---|---|
| KR | 20130007039 | U * | 12/2013 | |
| KR | 20130007452 | U * | 12/2013 | |
| WO | WO-2004080880 | A1 * | 9/2004 | B66C 13/18 |

OTHER PUBLICATIONS

"5-Gallon Pail-Lifter", downloaded from https://mobilept.com/allied/mpl200.html on Mar. 17, 2022, 1 page.

* cited by examiner

CONTAINER LIFTING SYSTEM

CROSS-REFERENCE TO RELATED APPLICATIONS

This claims the benefit of U.S. Provisional Patent Application No. 63/163,312 filed Mar. 19, 2021, the entire contents of which is incorporated herein by reference in its entirety.

BACKGROUND

The present invention is directed to methods and systems for providing assistance for lifting and moving of heavy objects such as containers.

Currently, there are many challenges relating to the movement of heavy objects, especially heavy objects that require tactile, human interaction to move, position, or otherwise manipulate. One such object is a container filled with a heavy substance or liquid, such as paint. Furthermore, it is well-established that manually lifting heavy objects can lead to back strain and/or other injuries especially when a user uses improper form, technique, or lifts an object that is too heavy relative to the user's strength and/or capabilities. Some applications for lifting heavy objects exist, such as forklift-like lifting machines, but many challenges and shortcoming remain in existing applications. For example, movement vertically and/or horizontally can be limited, and a user can in some cases be physically permitted to lift multiple containers at a time or exceed a rated lifting capacity, which can be detrimental. Furthermore, existing applications can suffer from insufficient precision and control during movement.

Therefore, there is a need in the art to provide mobile, suspended, and versatile lifting and moving assistance to users who move and/or manipulate heavy objects.

SUMMARY

The present disclosure relates to a lifting assistance apparatus, a lifting attachment, and a method of manipulating a container using a user-controllable vertically-suspended lift control device that selectively retracts, extends, and/or holder a retractable load-bearing feature such as a cable in order to provide an easy and safe to use versatile way to move heavy objects manually.

According to a first aspect of the present disclosure, a lifting assistance apparatus is disclosed. According to the first aspect, the apparatus includes a vertically-suspended lift control device configured to selectively linearly retract, linearly extend, or hold a retractable load-bearing feature. The apparatus also includes a lifting attachment attached to the retractable load-bearing feature, where the lifting attachment includes an angled portion having two horizontally opposed lifting arms connected via a member and configured to fit to a container with a protrusion, such that the two lifting arms when positioned directly below the protrusion are configured to selectively contact and lift the container as the lifting attachment is at least partially lifted by a retraction of the load-bearing feature. The apparatus also includes a graspable portion configured to permit a user to select a horizontal position and height of the container using the control device by moving the container vertically and/or horizontally, where the control device operates to provide assistance to the user when moving the container in the vertical direction.

According to a second aspect of the present disclosure, a lifting attachment is disclosed. According to the second aspect, the attachment includes an angled portion having two horizontally opposed lifting arms connected via a member and configured to fit to a container with a protrusion, such that the two lifting arms when positioned directly below the protrusion are configured to selectively lift the container as the lifting attachment is lifted.

According to a third aspect of the present disclosure, a method of manipulating a container is disclosed. According to the third aspect, the method includes receiving a container to be moved to a desired location, the container including a protrusion. The method also includes positioning a lifting attachment having two horizontally opposed lifting arms proximate the container and below the protrusion. The method also includes raising the lifting attachment such that the lifting arms contact the protrusion, and a single movable unit is formed including the lifting attachment and the container. The method also includes using a controller to selectively control a height of the movable unit and/or manually move the movable unit horizontally.

DETAILED DESCRIPTION

Lifting attachments, shown and described below, can be used as a part of a lifting assistance apparatus or system, related methods, and the like. Various example lifting attachments for use with a lifting assistance apparatus are shown and described herein, such as a first example lifting attachment 110 described with reference to FIGS. 1-8. Various control devices, including power-assisted retractable cable-based devices, can be used to selectively lift a lifting attachment to assist a user while lifting heavy and generally cylindrical objects, such as containers, pails, buckets, or any other suitable object, container, or item. In various embodiments, the control device operates to provide lifting assistance to the user when moving the container in the vertical direction such that a user defined movement is amplified when received at the feature. Examples of control devices as contemplated herein include commercially-available systems produced by Binar Quick Lift Systems AB or Binar Handling AB, such as various models of the Quick-Lift, such as manipulator arms, rail systems, control handles, external handles, control boxes, end effectors, and the like.

Figure 1:
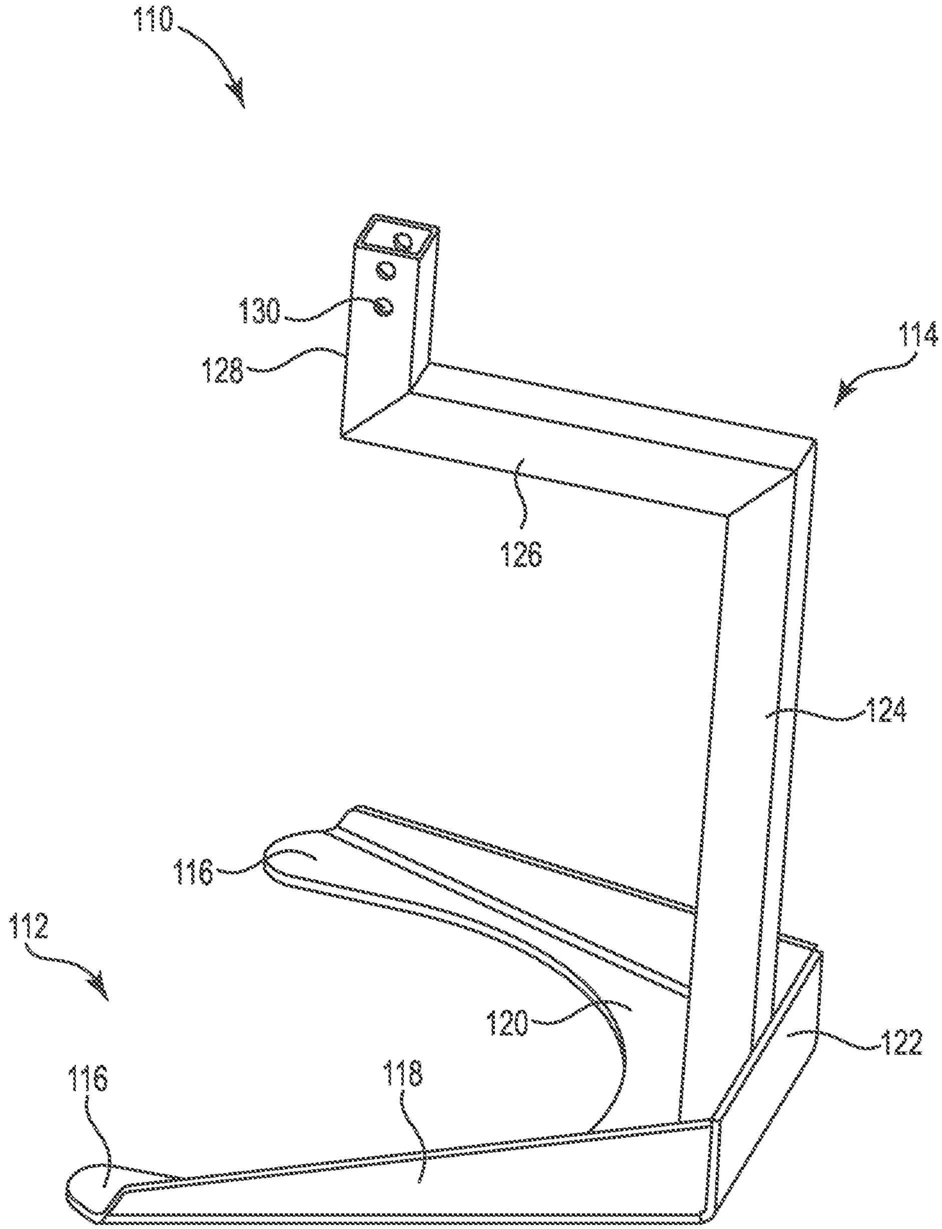
FIG. 1 is a perspective view of a lifting attachment for a lifting assistance apparatus, according to various embodiments.
Figure 2:
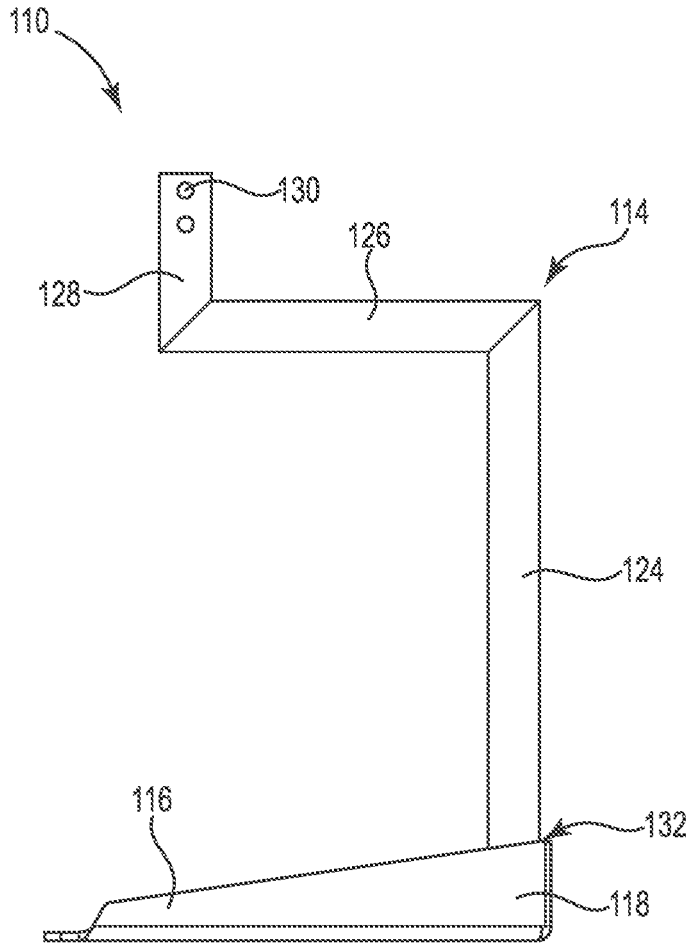
FIG. 2 is a side view of the lifting attachment of FIG. 1, according to various embodiments.
Figure 3:
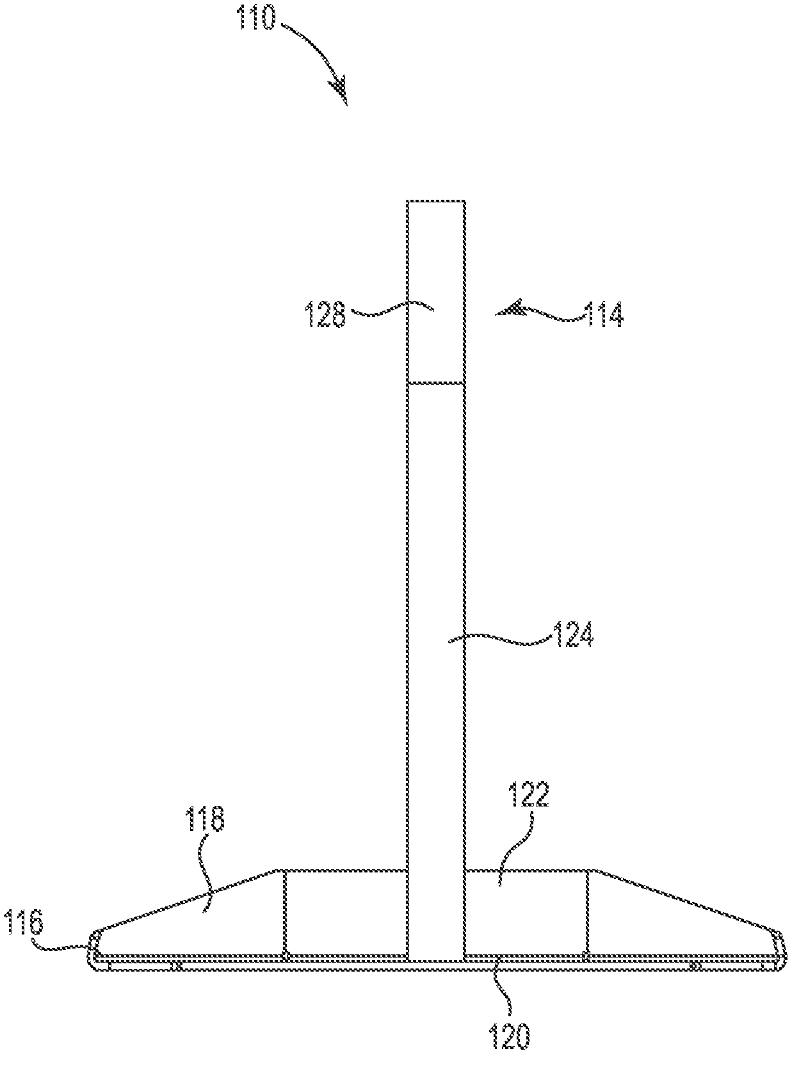
FIG. 3 is a rear view of the lifting attachment of FIG. 1, according to various embodiments.
Figure 5:
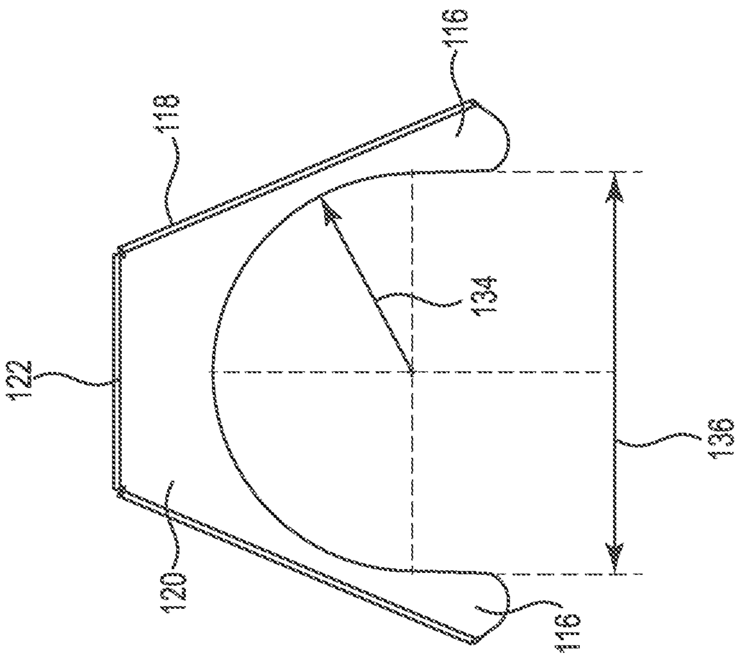
FIG. 5 is a bottom view of a portion of the lifting attachment of FIG. 1, according to various embodiments.
Figure 4:
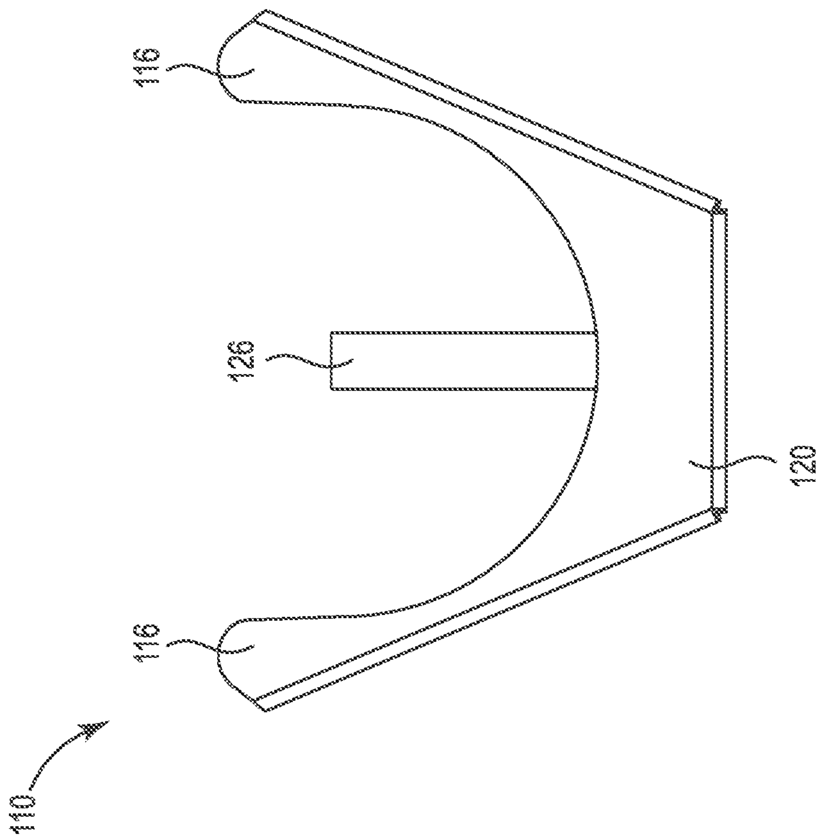
FIG. 4 is a bottom view of the lifting attachment of FIG. 1, according to various embodiments.
Figure 7:
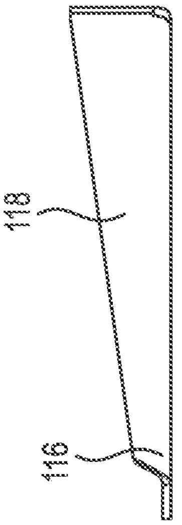
FIG. 7 is a side view of a portion of the lifting attachment of FIG. 1, according to various embodiments.
Figure 8:
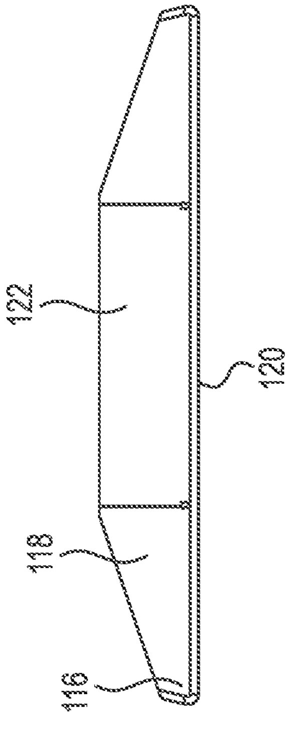
FIG. 8 is a front view of a portion of the lifting attachment of FIG. 1, according to various embodiments.
Figure 6:
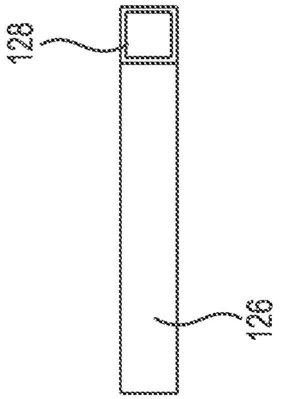
FIG. 6 is a top view of a portion of the lifting attachment of FIG. 1, according to various embodiments.

As shown in FIG. 1, the lifting attachment 110 is a contact-based lifting article or structure. As shown the lifting attachment 110 has an angled (e.g., in the horizontal plane), container-receiving portion 112 having two horizontally opposed lifting arms 116 connected via a member 120. The container-receiving portion 112 is configured to fit closely to a container (e.g., container 12 shown in FIGS. 14-18). As shown, member 120 and lifting arms 116 can be substantially horizontal and planar. Reinforcement arm portion 118 structurally reinforces the lifting arms 116 and reinforcement member portion 122 structurally reinforces the member 120 and connects to vertical member 124 at connection point 132 (see FIG. 2) and at a centering feature 114 to the lifting arms 116. Various components of the lifting attachment 110 can be formed of metal, plastic, or any other suitable material strong and resilient enough to be capable of lifting heavy objects.

As shown, the lifting attachment 110 includes a squared-off, angled offset centering feature 114, where the lifting attachment is attached to the retractable load-bearing feature by an angled offset portion (e.g., including member 124, 126, 128, and the like) such that when the lifting arms 116 lift the container the retractable load-bearing feature is attached to the center of gravity of the container in the horizontal plane as the container is held by the lifting arms 116. The angled offset portion of the lifting attachment 110 preferably includes the vertical member 124 that is connected to a horizontal member 126 that preferably also connects to a connection vertical portion 128 that can include one or more connection apertures 130 for connection to the load-bearing feature, e.g., of a lifting or other control device (not shown).

The angled offset of the centering feature 114 can include a "gooseneck" like and optionally angular shape, including a squared-off configuration (or a curved configuration as described below with reference to FIGS. 9-21). The centering feature 114 is preferably shaped and sized to provide a vertical clearance below defined between a horizontal plane of the two lifting arms 116 and a portion of the angled offset portion such that an amount of vertical clearance is provided that is sufficient to receive the container without obstruction by the angled offset portion of the centering feature 114. The actual offset distance provided by the centering feature 114 can be substantially equivalent to a length of the horizontal member 126.

The member 120 of the container-receiving portion 112 connects lifting arms 116 as a generally semicircular or at least partially arch-shaped member as shown. The semicircular member 120 can U-shaped with a radius of curvature 134 (e.g., 5.63", see FIG. 5) such that the member 120 is configured to conform to a generally cylindrical container to be lifted. The lifting arms 116 can also open toward a receiving end of the lifting attachment 110 such that an angle 136 (e.g., 4 degrees) is formed by the two lifting arms 116, optimizing receiving of the container. The member 120 can take other suitable shapes provided the member 120 and lifting arms 116 conform to a container to be lifted such as is described herein. For example, the member 120 and include non-curved straight portions connected at one or more angles or the like.

The example container 12 to be lifted typically has a protrusion, such that the two lifting arms 116 of the angled portion 112, when positioned directly below the protrusion of the container, are configured to selectively contact and lift the container 12 as the lifting attachment 110 is at least partially lifted by a retraction of a load-bearing feature. When present, the container protrusion can be a ring-like circumferential and protruding lip. In various embodiments the protrusion of the container includes at least one protruding bump or feature. In various embodiments, the container 12 has a primary diameter, and the protrusion is a diameter that is larger than the primary diameter of the container 12. In other embodiments where no lip is present, the container 12 is frustoconical, and the protrusion is an upper portion of the container with a relatively large diameter. It is understood that the lifting arms 116 of the lifting attachment 110 would be sized, shaped, and configured in accordance with characteristics of a typical or selected container or any other suitable object to be lifted, moved, manipulated, etc.

The lifting attachment 110 includes a graspable portion (e.g., vertical member 124, a handle, or the like) configured to permit a user to select a horizontal position and height of the container (e.g., container 12 shown in FIGS. 14-18) using a control device by moving the container vertically and/or horizontally, where the control device operates to provide assistance to the user when moving the container in the vertical direction. The graspable portion can be any suitable portion of the lifting attachment 110 and need not be a specifically-designed handle contoured to a user's hand.

Avoiding overloading a rated capacity the lifting attachment 110 and associated lifting assistance apparatus can have various health and safety benefits. In some preferable embodiments, the vertical clearance below the centering feature 114 is configured to be sufficient for loading one container, but insufficient to allow more than one container to clear the centering feature 114, preventing two or more stacked containers from being intentionally or inadvertently lifted at once. Thus, structural features can avoid human or machine error of overloading a lifting attachment 110 or related apparatus or systems.

Therefore, both a lifting attachment 110, a lifting assistance system using such a lifting attachment, and related methods are described herein.

With reference to FIGS. 9-13, a second embodiment of a lifting attachment 210 is shown.

Figure 9:
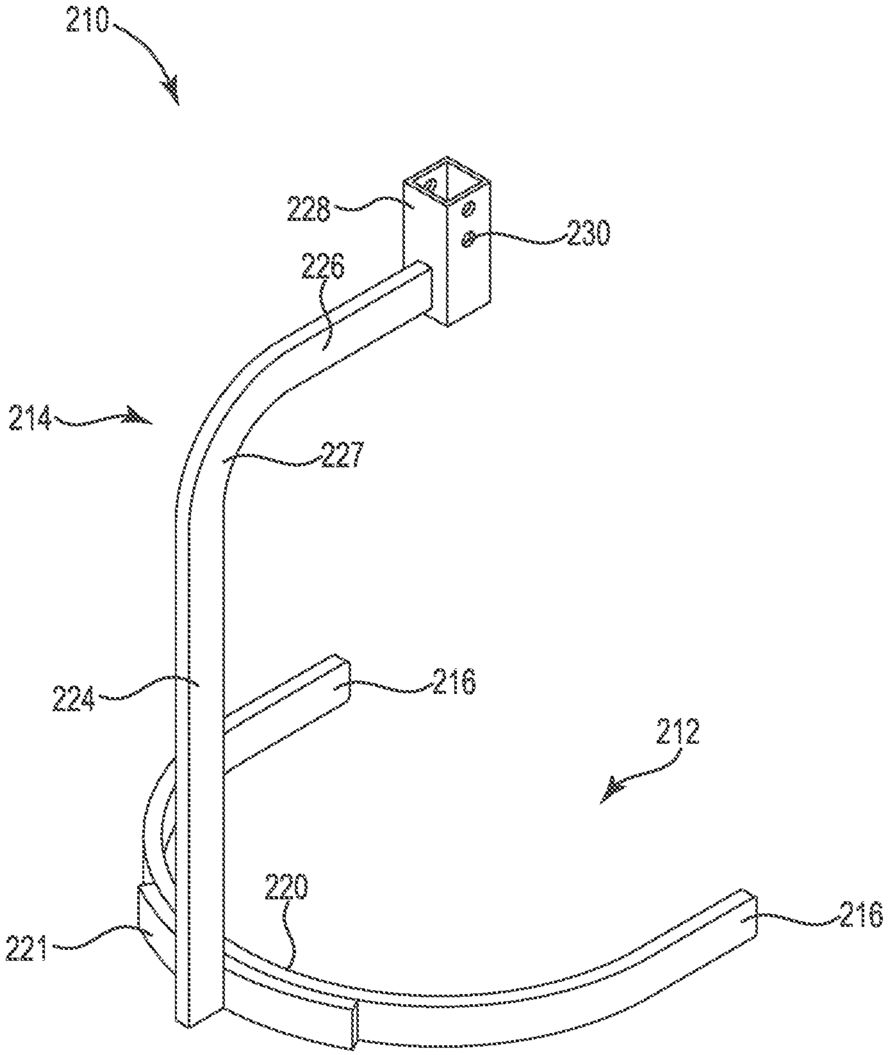
FIG. 9 is a perspective view of an alternative lifting attachment for a lifting assistance apparatus, according to various embodiments.
Figure 11:
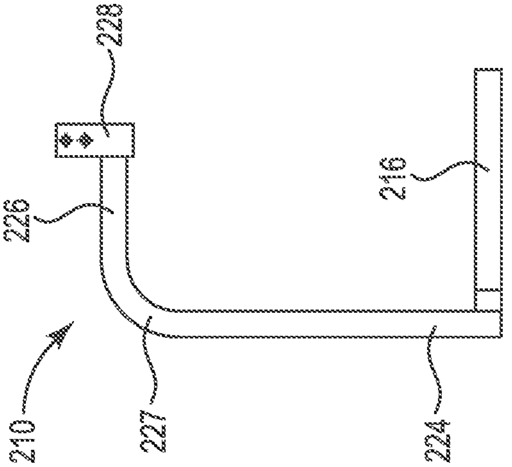
FIG. 11 is a side view of the lifting attachment of FIG. 9, according to various embodiments.
Figure 13:
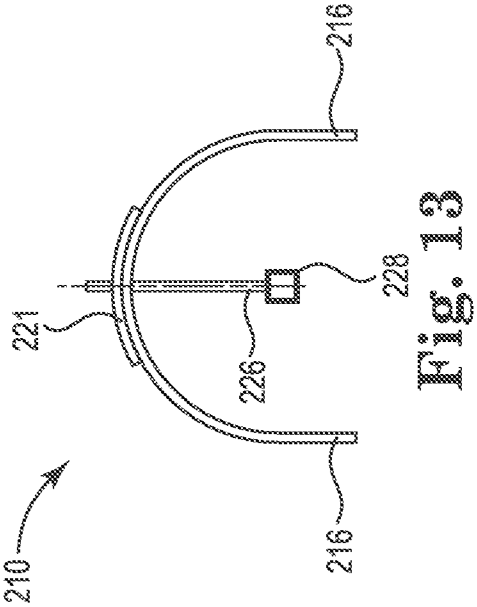
FIG. 13 is a bottom view of the lifting attachment of FIG. 9, according to various embodiments.
Figure 10:
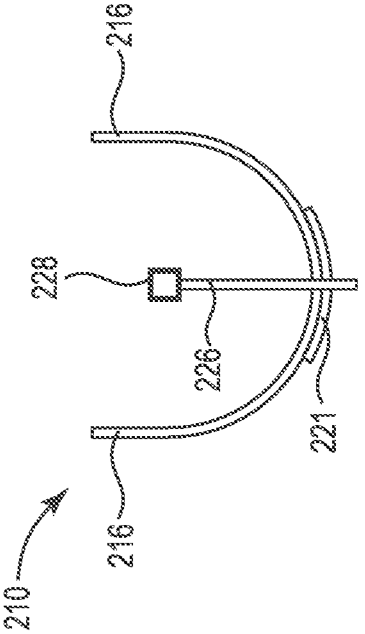
FIG. 10 is a top view of the lifting attachment of FIG. 9, according to various embodiments.
Figure 12:
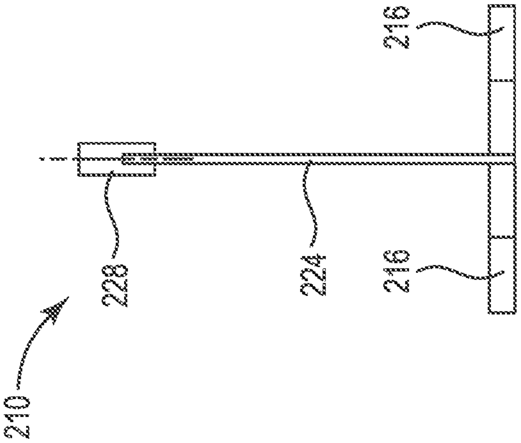
FIG. 12 is a rear view of the lifting attachment of FIG. 9, according to various embodiments.
Figure 15:
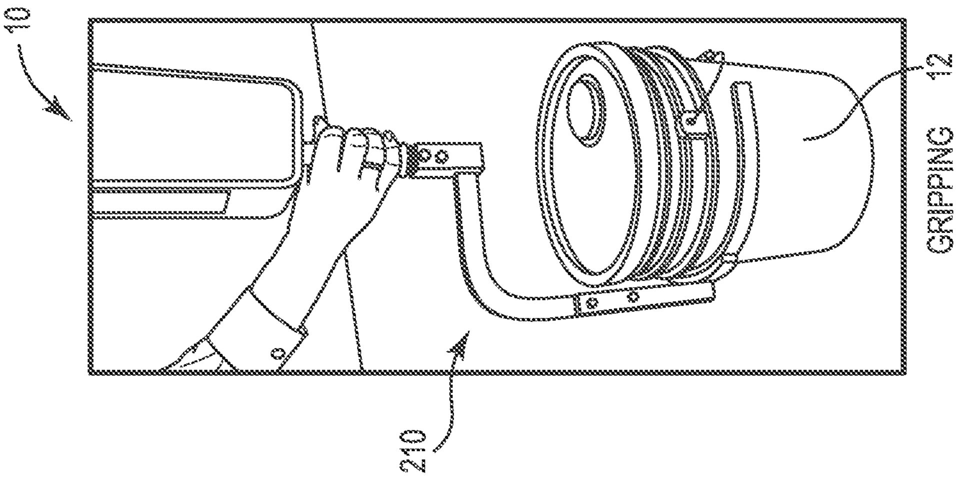
FIG. 15 shows a second step in a method of manipulating a container, according to various embodiments.
Figure 14:
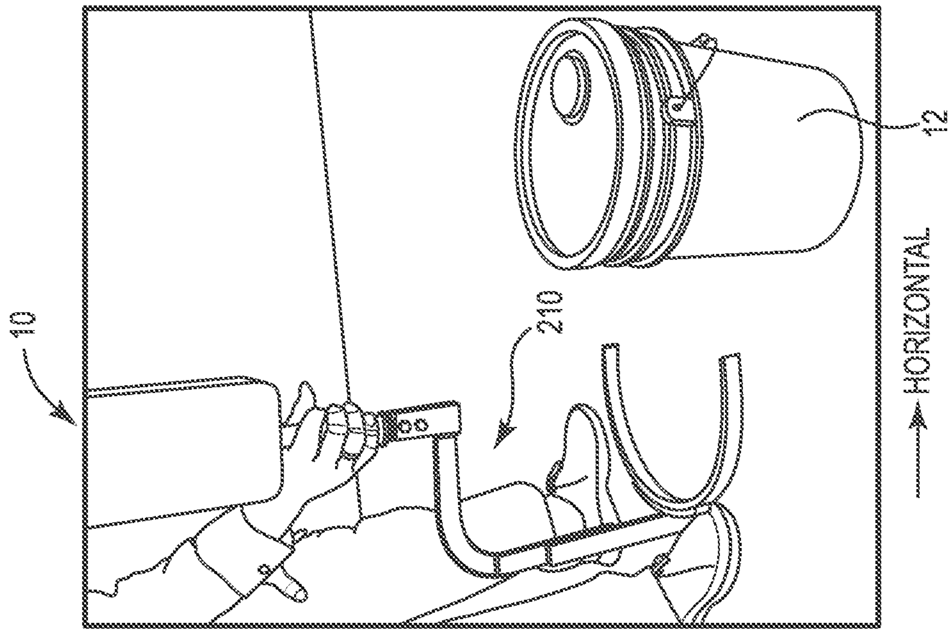
FIG. 14 shows a first step in a method of manipulating a container using the lifting attachment of FIG. 9, according to various embodiments.
Figure 17:
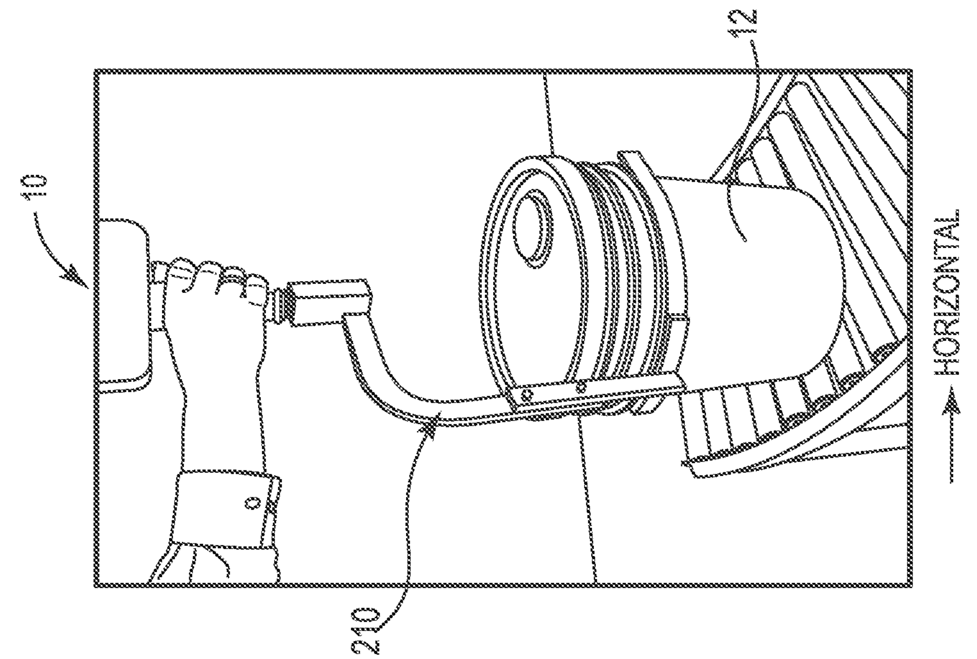
FIG. 17 shows a fourth step in a method of manipulating a container, according to various embodiments.

As shown in FIG. 9, an alternate lifting attachment 210 is shown. Lifting attachment 210 is functionally similar to lifting attachment 110, described above, but also includes a curved member 227 of the centering portion 214. The lifting attachment 210 has an angled, container-receiving portion 212 having two horizontally opposed lifting arms 216 connected via a member 220 and reinforced by a backing member 221. Member 220 is configured to fit to a container (e.g., container 12 shown in FIGS. 14-18). As shown, member 220 and lifting arms 216 are substantially vertical and curved. Various components of the lifting attachment 210 can be formed of metal, plastic, or any other suitable material capable of lifting heavy objects.

As shown, the lifting attachment 210 includes an angled, curved offset centering feature 214, where the lifting attachment is attached to the retractable load-bearing feature by an angled offset portion (e.g., including members 226, 224, 228, 227 and the like) such that when the lifting arms 216 lift the container the retractable load-bearing feature is attached to the center of gravity of the container in the horizontal plane as the container is held by the lifting arms 216. The angled offset portion of the lifting attachment 210 preferably includes the vertical member 224 that is connected to a horizontal member 226 by the curved member 227, the horizontal member 226 preferably also connects to a connection vertical portion 228 that can include one or more connection apertures 230 for connection to the load-bearing feature, e.g., of a lifting or other control device.

The angled offset of the centering feature 214 can include a gooseneck, curved, angled attachment feature and shape, as shown. The centering feature 214 is preferably shaped and sized to provide a vertical clearance below defined between a horizontal plane of the two lifting arms 216 and a portion of the angled offset portion such that an amount of vertical clearance is provided that is sufficient to receive the container without obstruction by the angled offset portion of the centering feature 214. The actual offset distance provided by the centering feature 214 can be substantially equivalent to a horizontal length of the horizontal member 226 and curved member 227.

Now with reference to FIGS. 14-18, a method of manipulating a container 12 is shown using a lifting attachment 210, e.g., as part of an example lifting assistance apparatus, described above. The example method includes five selected steps. The example lifting assistance apparatus shown with reference to FIGS. 14-18 includes a vertically-suspended lift control device 10 configured to selectively linearly retract, linearly extend, or hold a retractable and/or spoolable load-bearing feature (e.g., a cable). The lifting assistance apparatus includes a lifting attachment 210 described above attached to the retractable load-bearing feature. It is to be understood that example lifting attachment 210 is shown, but any other suitable lifting attachment could be used (e.g., 110, 310, etc.).

Initially, a container 12 to be moved is identified, received, and/or provided. The container 12 has a protrusion, such as a rim at an upper edge thereof. At step 1 shown in FIG. 14 and step 2 shown in FIG. 15, the lifting attachment 210 having two horizontally opposed lifting arms 216 is positioned proximate the container 12 and below the protrusion of the container 12. The lifting attachment 110 and container 12 are now preferably connected, abutted, and/or locked in a single movable unit.

Figure 16:
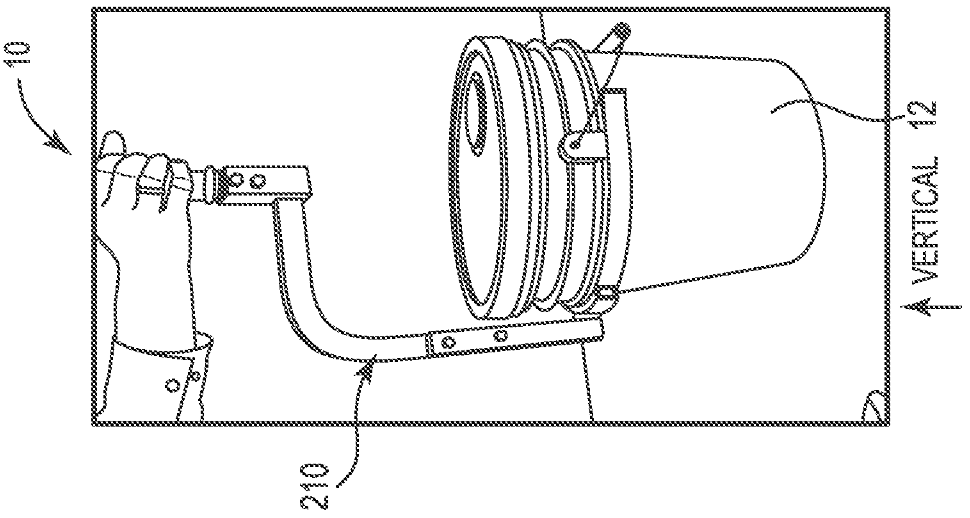
FIG. 16 shows a third step in a method of manipulating a container, according to various embodiments.
Figure 18:
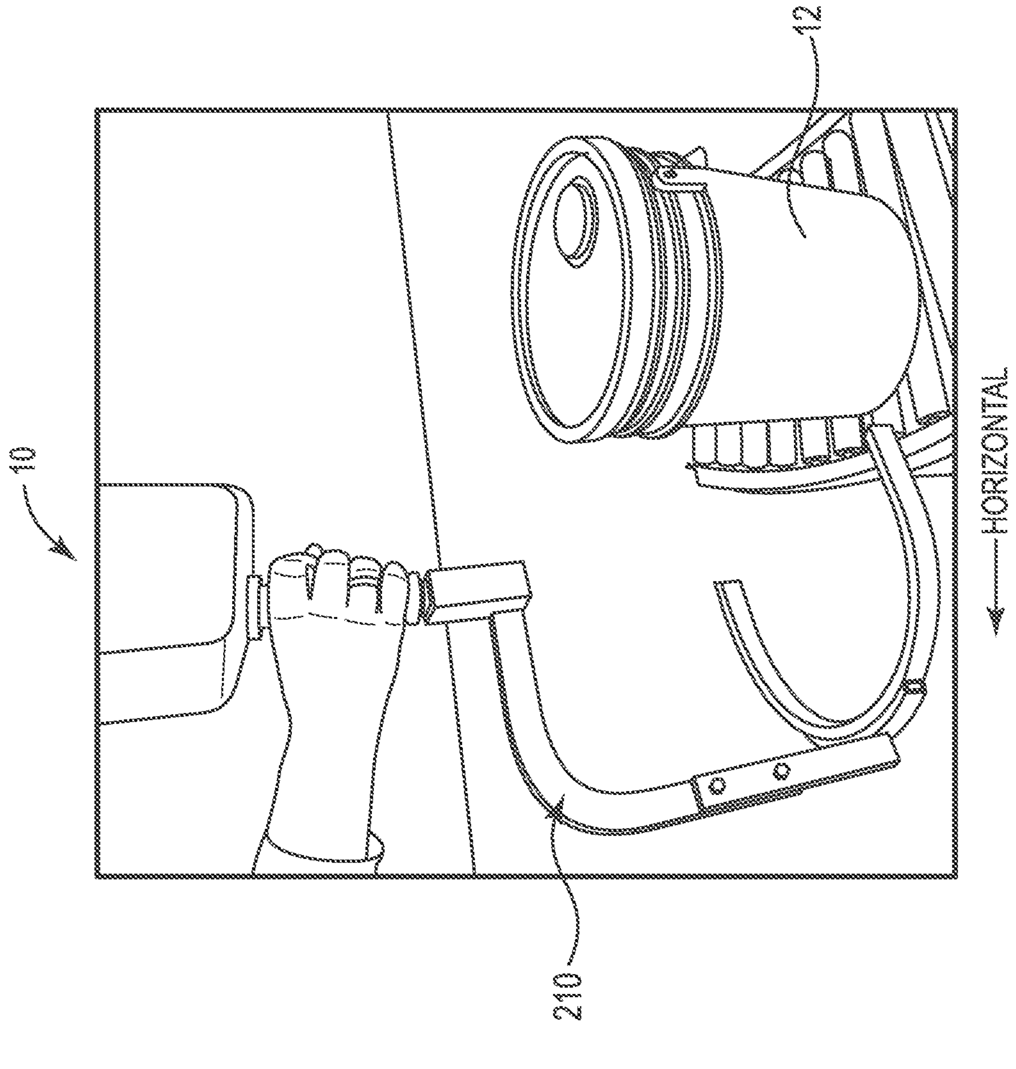
FIG. 18 shows a fifth step in a method of manipulating a container, according to various embodiments.

Next, at step 3 of FIG. 16, the lifting attachment 210 is raised using the controller 10 such that the lifting arms 216 of the lifting attachment 210 contact the protrusion of the container 12, and the single movable unit is formed comprising the lifting attachment 210 and the container 12. As shown at step 4, the user preferably uses a controller 10 to selectively control a height of the movable unit vertically and/or manually move the movable unit horizontally as shown at step 5 of FIG. 18. The horizontal movement of the unit can be low-friction, power-assisted, or the like.

In various embodiments, the handle or graspable portion is located above the container during lifting for manipulation by the user.

Figure 19:
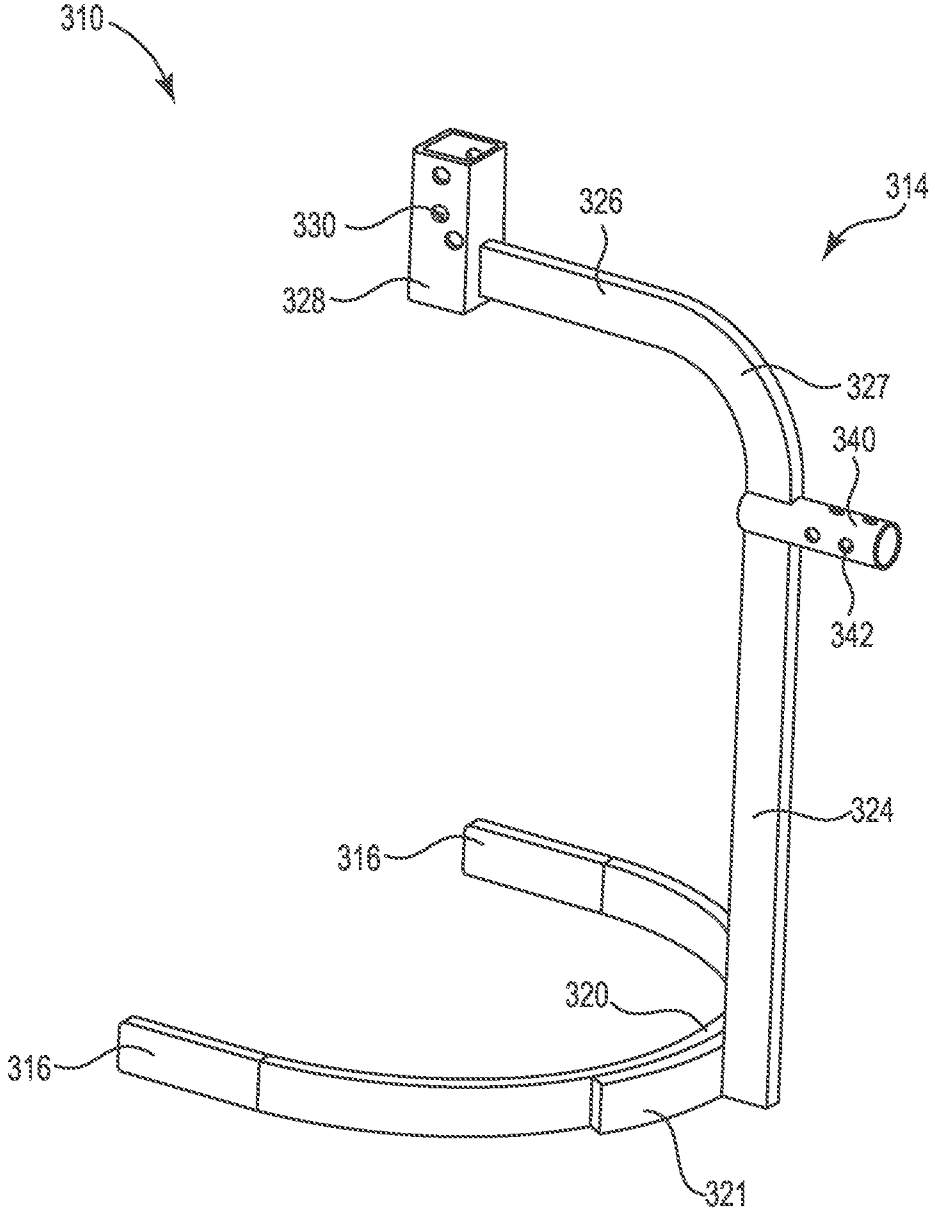
FIG. 19 is a perspective view of another alternative lifting attachment for a lifting assistance apparatus, according to various embodiments.
Figure 20:
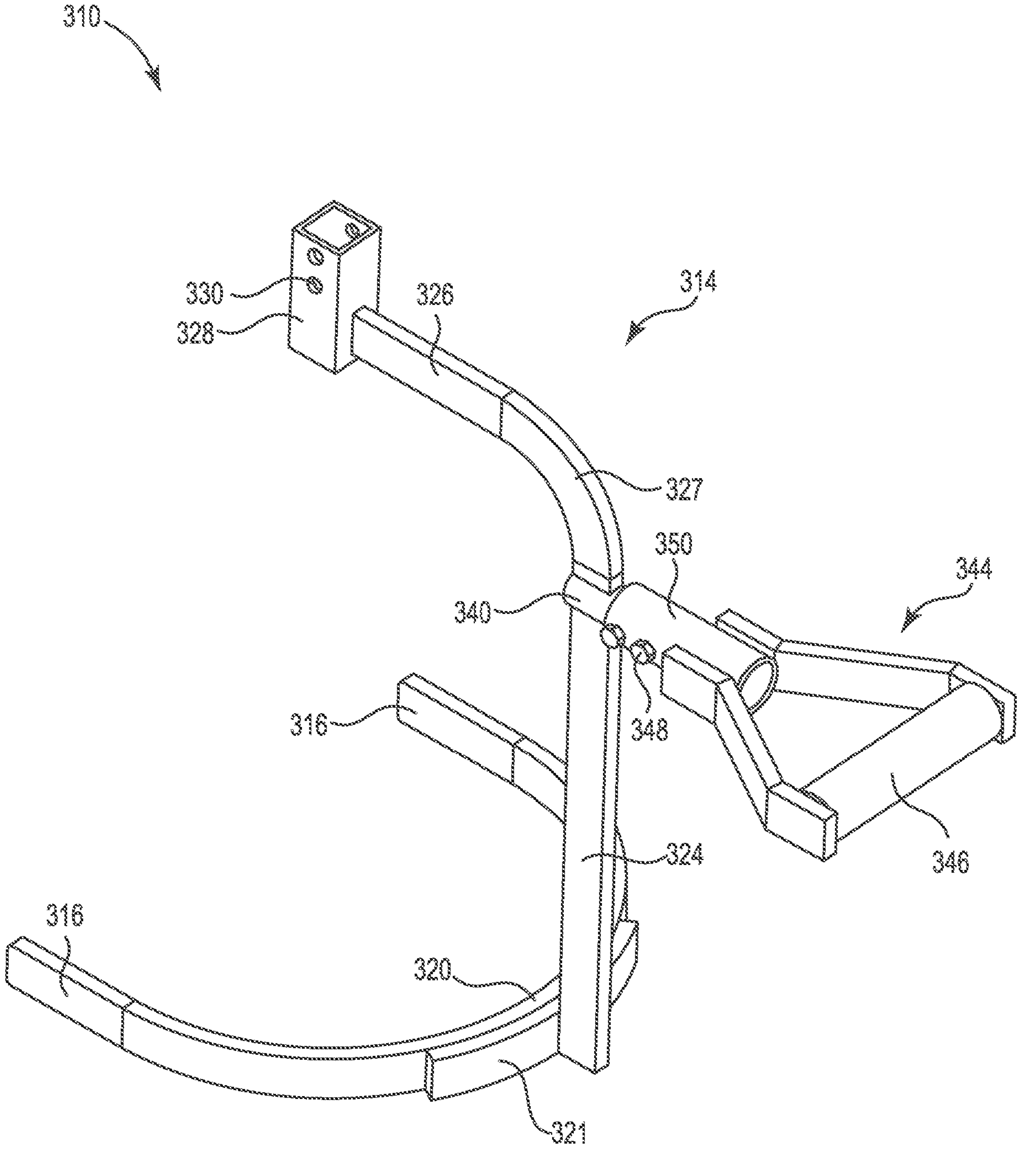
FIG. 20 is a perspective view of the alternative lifting attachment of FIG. 19, with a handle installed in a horizontal orientation, according to various embodiments.
Figure 21:
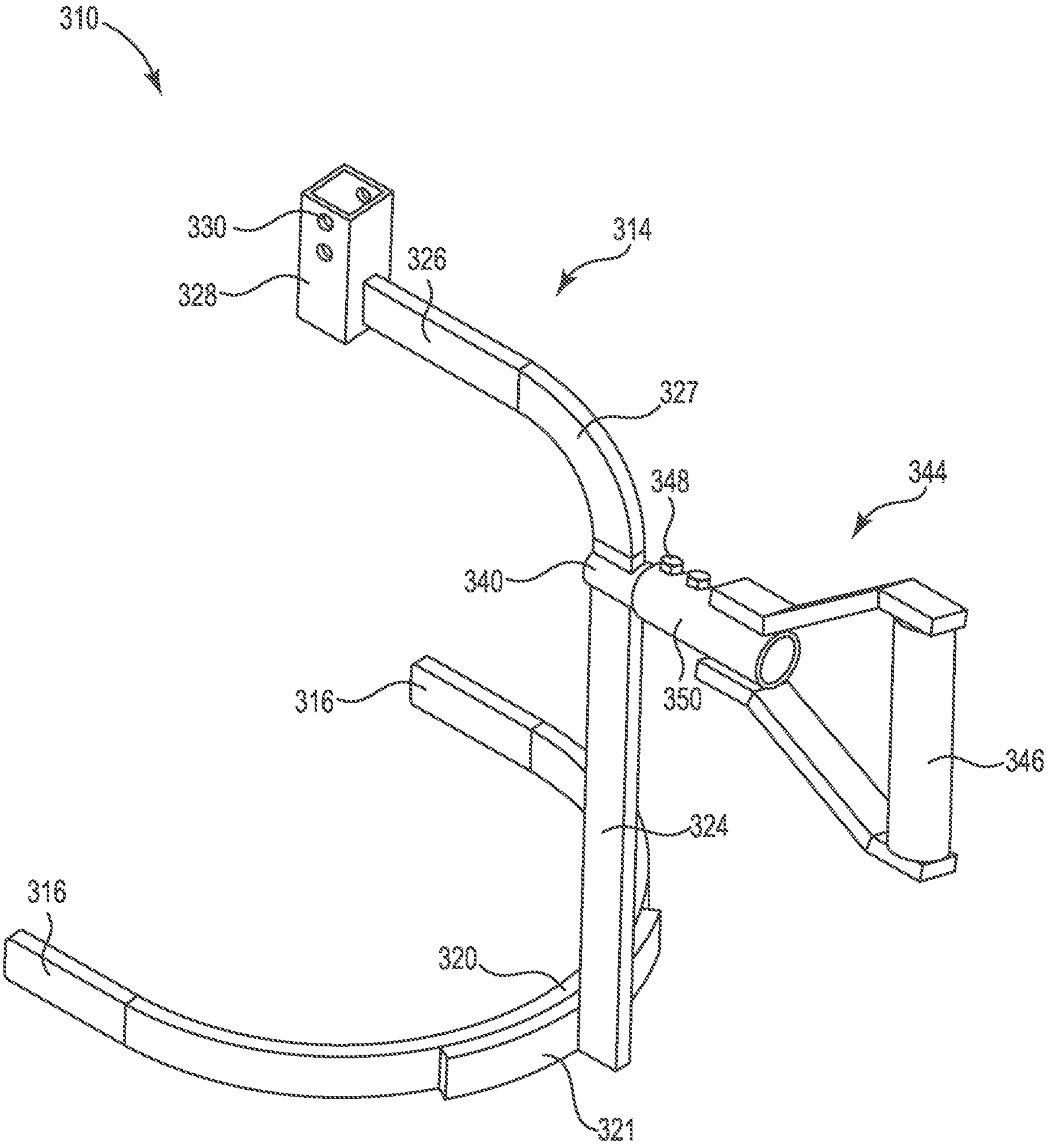
FIG. 21 is a perspective view of the alternative lifting attachment of FIG. 20, with a handle installed in a vertical orientation, according to various embodiments.

FIGS. 19-21 show a third embodiment of a lifting attachment 310. Lifting attachment 310 is similar to lifting attachment 210, with the addition of a purpose-built, user-graspable handle 344.

Lifting attachment 310 is functionally similar to lifting attachment 110 and 210 described above, and includes the addition of curved member 327 of the centering portion 314. The lifting attachment 310 has an angled, container-receiving portion 312 having two horizontally opposed lifting arms 316 connected via a member 320 and reinforced by a backing member 321. Member 320 is configured to fit to a container (e.g., container 12 shown in FIGS. 14-18). As shown, member 320 and lifting arms 316 are substantially vertical and curved. Various components of the lifting attachment 310 can be formed of metal, plastic, or any other suitable material capable of lifting heavy objects.

As shown, the lifting attachment 310 includes an angled, curved offset centering feature 314, where the lifting attachment is attached to the retractable load-bearing feature by an angled offset portion (e.g., including member 326, 324, 328, 327 and the like) such that when the lifting arms 316 lift the container the retractable load-bearing feature is attached to the center of gravity of the container in the horizontal plane as the container is held by the lifting arms 316. The angled offset portion of the lifting attachment 310 preferably includes the vertical member 324 that is connected to a horizontal member 326 by a curved member, the horizontal member 326 preferably also connects to a connection vertical portion 328 that can include one or more connection apertures 330 for connection to the load-bearing feature, e.g., of a lifting or other control device (e.g., controller 10, described above).

The angled offset of the centering feature 314 can include a gooseneck angled attachment feature and shape, including a curved configuration as shown. The centering feature 314 is preferably shaped and sized to provide a vertical clearance below defined between a horizontal plane of the two lifting arms 316 and a portion of the angled offset portion such that an amount of vertical clearance is provided that is sufficient to receive the container without obstruction by the angled offset portion of the centering feature 314. The actual offset distance provided by the centering feature 314 can be substantially equivalent to a horizontal length (e.g., and therefore corresponding horizontal offset) of the horizontal member 326 and curved member 327.

According to example lifting attachment 310, a graspable portion comprises a user-manipulable handle 344 connected to the vertical member of the centering feature 314 by a mount 340. In examples where the lifting attachment comprises the handle, and the handle 344 is attached to the vertical member 324 such that the handle is oriented horizontally and at 90 degrees from vertical. The handle 344 can include a grip 346 and a mounting barrel 350 that is fastenable to the mount 340 using one or more bolts 348 or other hardware. As shown in FIG. 20 the handle 344 can be mounted for over-the-top grasping by a user, or for from-the-side grasping by a user as shown in FIG. 21. The handle 344 can be removed from the mount 340 by removing the bolts 348, and can be reinstalled (or not) in various orientations (e.g., at 90-degree intervals) as desired.

In various embodiments (not shown), the handle 344 further comprises a control interface, such that actuating the control interface causes the vertically-suspended lift control device (e.g., controller 10) to selectively linearly retract, linearly extend, or hold the retractable load-bearing feature. In various embodiments, the handle 344 (if present) is attached to an angled offset portion of the centering feature 314. The handle 344 can be oriented at 90 degrees from vertical and optionally selectively axially rotatable about a horizontal axis.

The present invention has now been described with reference to several embodiments thereof. The entire disclosure of any patent or patent application identified herein is hereby incorporated by reference. The detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

The invention claimed is:

1. A lifting assistance apparatus, comprising:

a vertically-suspended lift control device configured to selectively linearly retract, linearly extend, or hold a retractable load-bearing feature;

a lifting attachment attached to the retractable load-bearing feature, wherein the lifting attachment comprises an angled portion having two horizontally opposed lifting arms connected via a member and configured to fit to a container with a protrusion, the container having a primary diameter and the protrusion having a diameter that is larger than the primary diameter, such that the two lifting arms when positioned directly below the protrusion are configured to selectively contact and lift the container as the lifting attachment is at least partially lifted by a retraction of the load-bearing feature; and a graspable portion configured to permit a user to select a horizontal position and height of the container using the control device by moving the container vertically and/or horizontally, wherein the control device operates to provide assistance to the user when moving the container in the vertical direction.

2. The lifting apparatus of claim 1, further comprising a centering feature, wherein the lifting attachment is attached to the retractable load-bearing feature by the centering features having an angled offset such that when the lifting arms lift the container the retractable load-bearing feature is attached to the center of gravity of the container in the horizontal plane as the container is held by the lifting arms.

3. The lifting apparatus of claim 2, wherein the centering feature comprises a gooseneck angled attachment feature.

4. The lifting apparatus of claim 2, wherein the centering feature provides a vertical clearance defined between a horizontal plane of the two lifting arms and a portion of the centering feature such that an amount of vertical clearance is provided that is sufficient to receive the container without obstruction by the centering feature.

5. The lifting apparatus of claim 4, wherein the vertical clearance is insufficient to allow more than one container to clear the centering feature, preventing two or more stacked containers from being lifted at once.

6. The lifting apparatus of claim 1, wherein at least a portion of the member is semicircular.

7. The lifting apparatus of claim 6, wherein the portion of the member that is semicircular is generally U-shaped with a radius of curvature such that it is configured to conform to a cylindrical container to be lifted.

8. The lifting apparatus of claim 1, wherein the protrusion is a circumferential and protruding lip.

9. The lifting apparatus of claim 1, wherein the protrusion comprises at least one protruding bump.

10. The lifting apparatus of claim 1, wherein the container is frustoconical, and the protrusion is an upper portion of the container with a relatively large diameter.

11. The lifting apparatus of claim 1, wherein the control device operates to provide lifting assistance to the user when moving the container in the vertical direction such that a user defined movement is amplified when received at the feature.

12. The lifting apparatus of claim 1, wherein the lifting attachment further comprises a user-manipulable handle, and wherein the handle is located above the container during lifting.

13. The lifting apparatus of claim 12, wherein the lifting attachment comprises the handle, and the handle is attached to a centering feature of the lifting attachment such that the handle is oriented at 90 degrees from vertical.

14. The lifting apparatus of claim 13, wherein the handle further comprises a control interface, such that actuating the control interface causes the vertically-suspended lift control device to selectively linearly retract, linearly extend, or hold the retractable load-bearing feature.

15. The lifting apparatus of claim 12, wherein the handle is attached to a centering feature.

16. The lifting apparatus of claim 15, wherein the handle is oriented at 90 degrees from vertical.

17. The lifting apparatus of claim 1, wherein the angled portion is an arched portion.

18. A lifting attachment, comprising:

an angled portion having two horizontally opposed lifting arms connected via a member, a portion of the member being semicircular, and configured to fit to a container with a protrusion, such that the two lifting arms when positioned directly below the protrusion are configured to selectively lift the container as the lifting attachment is lifted;

an angled offset portion configured to connect to a vertically-suspended lift control device configured to selectively linearly retract, linearly extend, or hold a retractable load-bearing feature; and a graspable portion configured to permit a user to select a horizontal position and height of the container using the control device by moving the container vertically or horizontally.

19. A method of manipulating a container, comprising:

receiving a container to be moved to a desired location, the container comprising a protrusion, the container having a primary diameter and the protrusion having a diameter that is larger than the primary diameter;

positioning a lifting attachment having two horizontally opposed lifting proximate the container and below the protrusion;

raising the lifting attachment such that the lifting arms contact the protrusion, and a single movable unit is formed comprising the lifting attachment and the container; and using a controller to selectively control a height of the movable unit and/or manually move the movable unit horizontally.

* * * * *